No. 840,306. PATENTED JAN. 1, 1907.
F. T. FARMER.
ADJUSTING DEVICE FOR CONE BALL BEARINGS.
APPLICATION FILED MAR. 9, 1906.
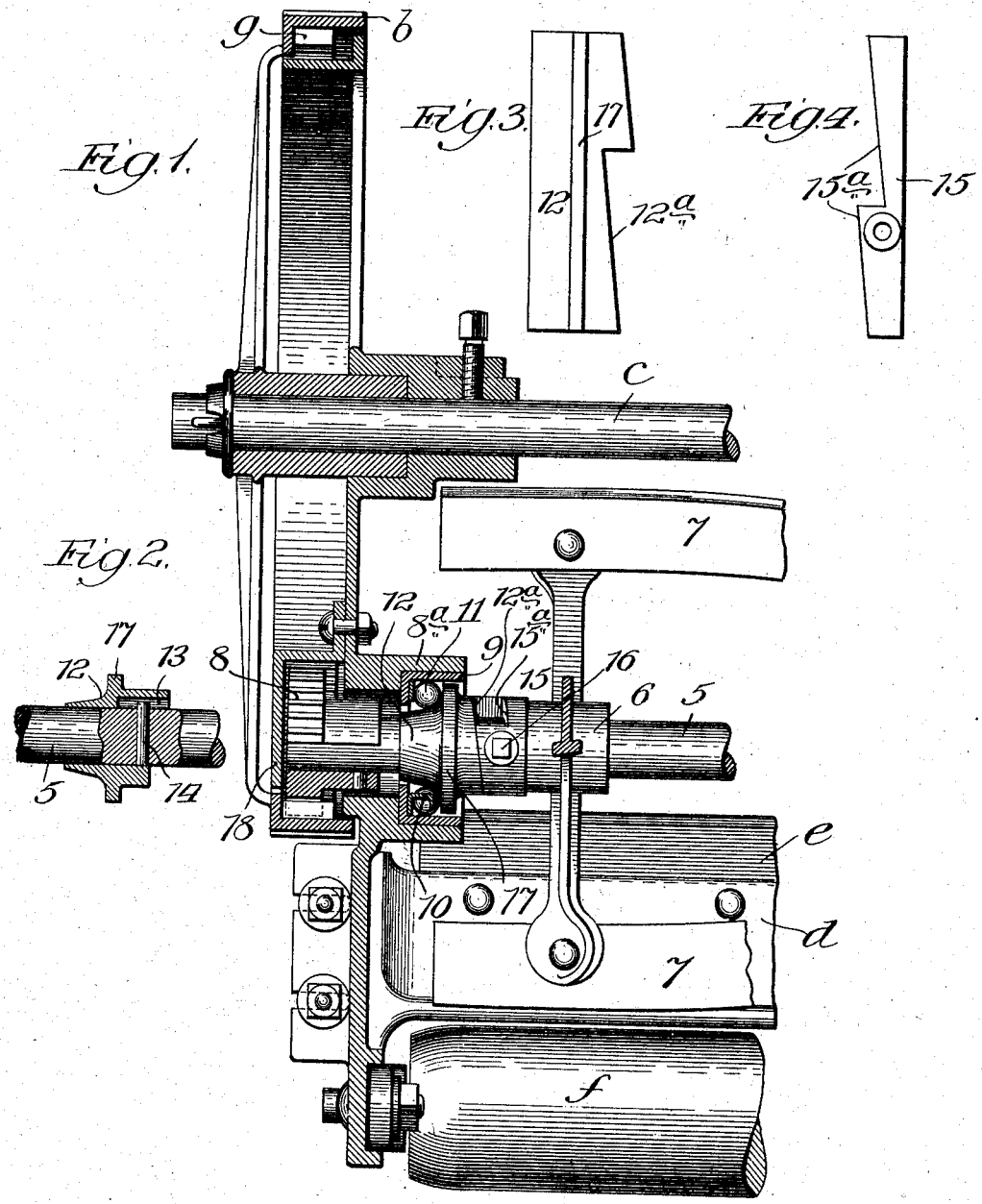
Witnesses:
Inventor,
Frank T. Farmer,
By Robert Catherwood
Atty.

UNITED STATES PATENT OFFICE.

FRANK T. FARMER, OF CHICAGO, ILLINOIS, ASSIGNOR TO THE WHITMAN & BARNES MANUFACTURING CO., OF AKRON, OHIO, A CORPORATION OF OHIO.

ADJUSTING DEVICE FOR CONE BALL-BEARINGS.

No. 840,306.  Specification of Letters Patent.  Patented Jan. 1, 1907.

Application filed March 9, 1906. Serial No. 305,069.

*To all whom it may concern:*

Be it known that I, FRANK T. FARMER, a citizen of the United States, residing in the city of Chicago, county of Cook, and State of Illinois, have invented a certain new and useful Improvement in Adjusting Devices for Cone Ball-Bearings, of which the following is a specification.

My invention relates to means for adjusting and tightening the contact between the cone surfaces and the balls of cone ball-bearings to prevent injury occasioned by loose contact, and thereby prolong the life of the bearings and render their operation more accurate.

The object of the invention is to provide a simple, economical, and efficient device of this character readily operated by unskilled persons and having considerable throw, so that the parts may be repeatedly adjusted to take up lost motion or relieve tension when jammed or crowded.

While my device is adapted for use on any cone ball-bearing, it is particularly useful on the ball-bearings of lawn-mower reels, where an easy and accurate shear is required between the revolving cutter-blades and the stationary cutter-bar. In such a machine the loosening of the reel-bearings is especially objectionable.

To illustrate my invention I have therefore shown in the accompanying drawings the parts of a lawn-mower adjacent to the ball-bearings fitted with a device embodying my invention. Where desired, two of my devices may be applied to the ends of the reel, though in the drawings I have shown but one.

Figure 1 is a broken horizontal sectional plan view of parts of a lawn-mower adjacent to the ball-bearings of the reel, showing my device in position between the hub of the spider and the flange of the cone. Fig. 2 is a broken detail sectional elevation of the reel-shaft and the annular cone-bearing mounted thereon; and Figs. 3 and 4 are developed views of one of the annular cone-bearings and of one of the adjusting-collars, respectively.

The lawn-mower shown comprises the usual frame A; traction-wheel $b$ on main driving-shaft $c$; reel-shaft 5, operatively connected to the traction-wheel by pinions 8 within the housing 18 of the traction-wheel and adapted to engage the usual internal gear $g$, and thus transmit power to the reel-shaft; spiders 6, carrying cutter-blades 7; cross-bar $d$, attached to the frame at the ends and supporting stationary cutter-bar $e$, roll $f$ secured at the ends to the side frame and supporting the machine when in use.

5 indicates any shaft supported in ball-bearings within the main bearing $8^a$. The ball-bearings comprise the usual cap 9, which protects the retaining-ring 10, spacing and confining the balls 11.

12 indicates a cone-bearing mounted on shaft 5, provided on its inner face with a longitudinal groove 13, engaging a pin 14 upon the shaft 5 so as to turn with the shaft, but having capacity for longitudinal movement thereon in the direction of the balls. The cone is also provided on the side opposite to the bearings with a spiral cam-face $12^a$. The parts on the left-hand side of the flange 17 of the annular cone-bearing are those usually found in such devices. The rear or inner surface of the cone 12 is provided with a cam-face $12^a$, the annular adjusting-collar 15 impinging against the supporting block or hub 6, which holds it in contact with the cone, and having on the face adjacent to the cone a cam-surface $15^a$. The adjusting-collar 15 is provided with a set-screw 16, adapted to secure the collar at the desired points on the shaft.

As shown in the drawings, the hub of the spider affords the necessary support for the adjusting-collar, though it will be readily seen that any block or rigid support may be used to accomplish this purpose.

The operation of my device is as follows: The cam-faces of the spirals $15^a$ and $12^a$ are first intermeshed and the position of the pin 14 through the shaft 5 is determined, this pin and hole 13 being so placed that the ball-bearing cone is held against the balls and the adjusting-collar, which in turn is supported in close contact with the hub or block 6. The parts 6, 15, 12, and 11 are thus all in successive contact, the adjusting-collar being secured in place by set-screw 16. As the parts become worn or otherwise loosened they may be tightened or adjusted by loosening set-screw 16 and turning the collar about the shaft, so that the spirals $15^a$ and $12^a$ impinge and press the cone 12 against the balls 11.

This operation may be repeated from time to time until the cone is pushed along the shaft a distance equal to the step of the spiral. In practice this will be found sufficient, since by the time such considerable adjustments are needed the balls will be worn out.

Having thus described my invention, what I claim is—

1. A ball-bearing comprising a bearing-cup having a ring and balls therein, a cone, adapted to fit within said cup and rest upon said balls, mounted to rotate with a shaft but free to move longitudinally thereon, having on the face opposite to said cup a cam-surface, a hub or block rigidly secured to said shaft, an adjusting-collar, adapted to be secured to said shaft by a set-screw, intermediate of and contacting with said block and cone and having on the side adjacent to the latter a cam-surface oppositely pitched to the cam-surface on said cone, whereby said collar may be turned to adjust said cone relative to said balls.

2. The combination of a rotating shaft having a cone secured thereon, one of said members being provided with a groove and the other with a pin adapted to engage therewith to permit independent longitudinal movement of the cone on said shaft while securing it to rotate therewith, an adjusting-collar adapted to be secured at any point about the circumference of said shaft by a set-screw, said cone and collar having oppositely-pitched cam-faces, and a block secured to said shaft adapted to hold said cam-faces in contact whereby said cone is moved longitudinally on said shaft by turning said collar.

3. The combination of a rotating shaft, a bearing-cup containing balls, a cone fitted within said balls secured on said shaft to rotate therewith but free to move longitudinally thereon, a collar contacting with said cone secured to said shaft by a set-screw, and a block on said shaft adapted to maintain said contact, the adjacent faces of said cone and collar having oppositely-pitched cam-surfaces whereby said cone may be adjusted by setting said collar at different points around said shaft.

4. The combination of a rotating shaft, a cone secured to rotate therewith but free to move longitudinally thereof, balls, a bearing-cup adapted to hold the said balls in contact with the inclined sides of said cone, a collar contacting with the rear of said cone adapted to be secured in different positions on the circumference of said shaft and a block on said shaft adapted to maintain said contact, the adjacent faces of said collar and cone having oppositely-pitched cam-surfaces.

FRANK T. FARMER.

Witnesses:
W. E. ROWELL,
WATTS HOLENWOOD.